(12) United States Patent
Markman et al.

(10) Patent No.: US 10,783,339 B2
(45) Date of Patent: Sep. 22, 2020

(54) RFID MULTI-READ PORTAL

(71) Applicant: Fujitsu Frontech North America Inc., Foothill Ranch, CA (US)

(72) Inventors: Herbert Markman, Wynnewood, PA (US); Aaron Teter, King of Prussia, PA (US); Jeffrey Markman, Narberth, PA (US); Shinichi Nagayumi, Bryn Mawr, PA (US); Daniel G. Dalton, Laguna Beach, CA (US)

(73) Assignee: Fujitsu Frontech North America Inc., Foothill Ranch, CA (US)

( * ) Notice: Subject to any disclaimer, the term of this patent is extended or adjusted under 35 U.S.C. 154(b) by 34 days.

(21) Appl. No.: 16/233,560

(22) Filed: Dec. 27, 2018

(65) Prior Publication Data

US 2019/0311164 A1 Oct. 10, 2019

Related U.S. Application Data

(60) Provisional application No. 62/654,702, filed on Apr. 9, 2018.

(51) Int. Cl.
*G06K 7/08* (2006.01)
*G06K 7/10* (2006.01)

(52) U.S. Cl.
CPC ............... *G06K 7/10415* (2013.01)

(58) Field of Classification Search
CPC ............ G06K 7/10415; G06K 7/10425
See application file for complete search history.

(56) References Cited

U.S. PATENT DOCUMENTS

| | | |
|---|---|---|
| 2,599,944 A | 6/1952 | Salisbury |
| 9,760,826 B1 | 9/2017 | Stine et al. |
| 2008/0177591 A1* | 7/2008 | Mattlin .............. G06K 17/00 |
| | | 705/7.29 |

(Continued)

FOREIGN PATENT DOCUMENTS

WO    2013014406 A2    1/2013

OTHER PUBLICATIONS

Cuming Microwave, C-RAM MT product specification, downloaded Apr. 30, 2019, http://stores.cumingmicrowave-online-store.com/11-c-eam-mt-30-5-x-24-x-24/.

(Continued)

*Primary Examiner* — Thien M Le
(74) *Attorney, Agent, or Firm* — Duane Morris LLP

(57) ABSTRACT

An RFID portal reads multiple associated RFID tags on articles in groups moved through an RFID code reader having interrogation/charging and receiving/detection antennas concentrated on the group when in a reading zone. The articles are movable through a passage between the reading zone and an outside area. The passage has conductive walls at the reading zone associated with antennas for applying and collecting focused RF signals, and the walls define a vestibule lined with broadband or specific stopband electromagnetic damping structures as well as elongating signal paths into and/or out of the reading zone. Attenuation by one or more of broadband and stopband damping and signal path elongation can achieve 10 dB attenuation or more, sufficient to minimize interaction with stray RFID tagged articles that may be outside of the group in the reading zone.

18 Claims, 8 Drawing Sheets

(56) References Cited

U.S. PATENT DOCUMENTS

| | | | |
|---|---|---|---|
| 2008/0289973 A1* | 11/2008 | MacLeod | G08B 21/24 |
| 2009/0146812 A1* | 6/2009 | Rice | G06K 19/0723 |
| | | | 340/572.1 |
| 2011/0156909 A1* | 6/2011 | Rice | G06K 19/0723 |
| | | | 340/572.1 |
| 2017/0227624 A1* | 8/2017 | Wulff | G01S 5/0018 |
| 2017/0254876 A1* | 9/2017 | Wulff | G06K 7/10366 |
| 2018/0012466 A1* | 1/2018 | Wulff | G08B 13/196 |
| 2019/0205582 A1* | 7/2019 | Roth | G06K 7/10435 |
| 2020/0050806 A1* | 2/2020 | Forster | G06K 7/10346 |

OTHER PUBLICATIONS

Safe Living Technologies, Inc., Signal Protect Clear Film SLT-1053 product specification, downloaded Apr. 30, 2019, https://www.slt.co/products/RFShieldingWindowFilm/RFWindowFilm-SignalProtect-Clear.aspx.

\* cited by examiner

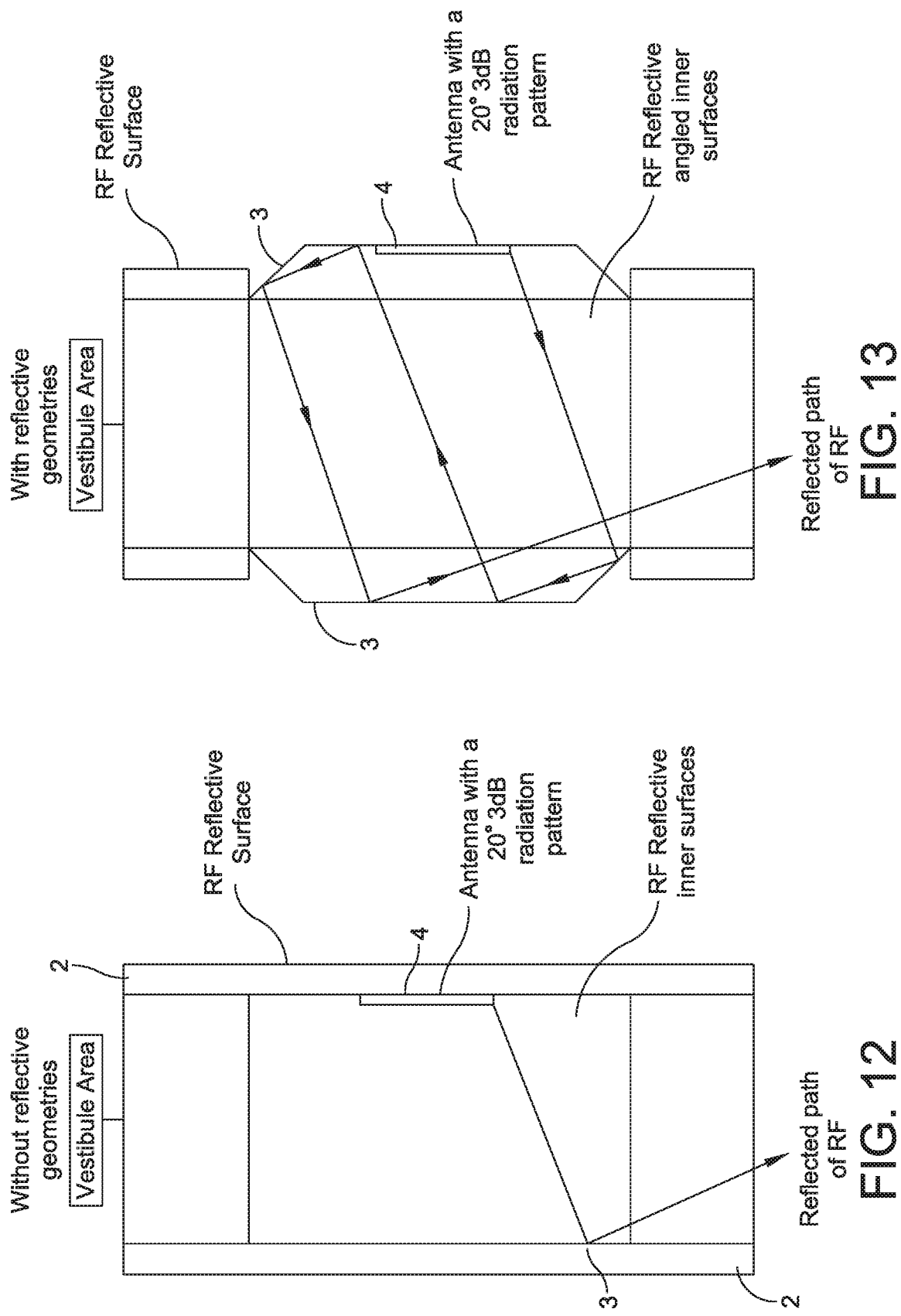

RFID MULTI-READ PORTAL

CROSS REFERENCE TO RELATED APPLICATION

This application claims the priority of U.S. provisional application Ser. No. 62/654,702, filed Apr. 9, 2018.

BACKGROUND

This disclosure relates to the field of readers for tagged RFID encoded articles, in particular multi-read tags in a group or batch, the tags carrying substantially unique data codes that are individually discernable by a polling process for interrogating the tags when the group is moved into a reading zone. Several aspects are employed individually and in combination, for concentrating electromagnetic interaction between with the tags and one or more system antennas that are directed at the reading zone. At the same time interaction is limited with tags that may be associated with articles that may be located nearby but are not members of the group. These aspects allow convenient ingress and egress to the reading zone, thereby providing an RFID multi-read portal that is particularly useful for reading articles that are manually carried into the reading zone or moved in on a cart, wheeled bin, shopping cart, garment hanging device or the like.

Disclosed methods and apparatus include partial enclosures lined with reflective surfaces that may be shaped to focus on the reading zone, adjacent electromagnetic signal damping structures containing lossy materials and optionally outwardly faced with reflective sheets, all arranged to restrict and attenuate propagation of signals outside of the reading zone and to elongate propagation paths. Additionally, variable control of RFID read/write signal levels and timing, in conjunction with sensing and signaling, are used to control one or more factors such as the RF power density and the residence time of a group of RFID multi-read tag encoded items being moved through a reading enclosure or along a transit path intersecting the reading zone. A result is to achieve prompt and relatively complete reading of the RFID codes present in a group, while minimizing unwanted interaction with other tagged articles.

Among other objects, one object is to use RF power density and interaction times that are minimally sufficient for charging (interrogating) and/or reading responses of the tags in the group, so that the codes of most or all of the tags that are present in the group are discerned successfully, while discriminating against unwanted interaction with tags that may be located nearby but are not members of that group. The group is a plurality of RFID tagged objects located in proximity with one another, for example being encompassed by a carrying bag, disposed in a movable cart or bin, carried on a discrete length of conveyor or similar conveyance, or otherwise arranged together while passing through a reading zone.

In order to read passive UHF RFID tags in a group, a sufficient RF power density is needed to interact with each of the tags. This includes power to charge each tag and also to communicate with the tag during a polling procedure. It may be possible to enhance RF power levels and/or to extend the interaction time to aid in this process, but that increases the risk of unwanted interaction with tags outside of the group. Other provisions are needed in a situation where successive groups are arranged in bins or carts that are queued up to a reading apparatus, or articles are located nearby but are not members of the group, such as in a retail environment.

RFID tags may be carried on articles that are densely arranged, such as in a pile or stack or hanger rack or otherwise adjacent state. Previously, reading densely placed tags has been done using a high or maximum possible power level to interrogate the tags and a high or maximum sensitivity antenna configuration to discern responses. The process of illuminating (charging) the tags and detecting responses likewise has been continued for a time period that is more than ample to read all of the tags in a worst case scenario, for example until no more responses from tags have been received for a given period of time. Performing this in an open environment risks incidental interactions over too large an area or volume, potentially encompassing RFID tags that are not part of the group of tags under scrutiny. For example, nominal RFID tag reading levels may be sufficient to interact with tags at a range of 20 feet (6 meters) or if conditions are ideal along a direct line of sight, even at 50 feet (15 m). It would be advantageous if robust power levels could be used, but interaction limited to a much smaller range, such as four feet (1.3 m).

A fully encompassing conductive enclosure can limit interaction to the tags located within the enclosure, but may be unsuitable for some applications. A high RF power density can be applied safely if an enclosure is well shielded electromagnetically, without interacting with tags outside of the enclosure. For example, a shielding enclosure can comprise a conductive hollow box with conductive shielding doors that can be closed to create an internally reflective reading area in which the tags are placed. Thus, interactions with tags is confined to the volume within the conductive box. The power level and residence time can be more than sufficient without unwanted external tag interactions. See, for example, U.S. Pat. No. 9,760,826, the full disclosure of which is hereby incorporated by reference, addressing these issues.

U.S. Pat. No. 9,760,826 discloses techniques for limiting unwanted interaction with tags outside of the enclosure by providing conductively sheathed walls along a transit path leading into and optionally beyond an enclosure containing antennas. Thus, an elongated shielded vestibule includes conductive sidewalls and optionally top and bottom conductive walls along incoming and outgoing transit paths. Batches or groups of tagged articles reside for a time in a central read zone that is substantially enclosed and where RFID antennas are mounted in indented niches. The incoming and outgoing paths can define a relatively long signal propagation path that is angled or curved to necessitate reflections, precluding direct line of sight signal pathways between the RFID antennas in the enclosure and "stray" RFID tags incidentally located outside of the disclosure. These provisions are effective in an industrial setting but can be claustrophobic and confining in other settings where an open plan is preferable, such as a retail checkout. Reading of stray tags in known open settings raises the risk of interacting with stray tags, detracting from the accuracy of article accounting, inserting errors as to which articles actually are present within a defined body of inventory, requiring safeguards when adding up cash register receipts if the reading is at point of sale, etc. There are aesthetic reasons to have an open reading apparatus but functional reasons to require enclosing the reading zone. What is needed is ways to improve electromagnetic confinement of the reading zone in a reading apparatus with an open structure.

SUMMARY

It is an object of the present disclosure to arrange the interrogation and response signaling of RFID antennas, to permit robust but preferably only just-sufficient signal amplitude and/or residence timing to read multi-read RFID tags in successive groups effectively while minimizing the risk of interaction with "stray" tags that are not members of the groups. For this purpose, structural arrangements and materials are provided at the reading zone and defining entry and/or exit vestibules including one or more of electromagnetically reflective surfaces that focus upon and enhance tag charging and signaling effects confined to a reading zone; likewise reflective vestibule structures that limit propagation outside the reading zone to indirect crisscross paths, to elongate signal propagation path lengths between the reading zone and external zones; and, selectively placed electromagnetically lossy absorptive materials along the vestibules, including thicknesses and surface facings that attenuate operational RF frequencies. The result is a multi-read RFID tag reading apparatus that can be of modest size, open on both ends without unduly interacting with stray tags, and generally advantageous in various applications including retail checkout lines, garment rack readers, textile processing lines and the like.

An object is to allow workers or customers to move through a multi-read tag reading area while carrying bags or rolling carts or other containers containing RFID tagged items that can be read with a high degree of dependability, while unimpeded by shielding doors that must be moved into and out of place to close off the reading area, that preferably can be configured without claustrophobic enclosures or maze-like vestibule paths and still exclude reading stray tags at least within a reasonable distance of one or two meters (3 to 6 feet). The disclosed apparatus and methods maintain a high enough RF density to enable high speed discernment of the IDs of numerous tags arranged densely in the reading zone. Embodiments are disclosed that allow reading RFIDs of many hundreds of items, such as textile items loaded atop one another in bags or bins, and without undue interaction with stray tags that may be located outside of the read enclosure. Although applicable to tunnel-like arrangements, embodiments are also disclosed wherein shielding and attenuating arrangements are contained in vestibule structures having a height, width and overall extent of enclosure that is not substantially more confining to a user or customer than a typical supermarket cash register checkout line.

The tagged items, bags, carts or containers can be moved manually while transiting the portal read area at a normal walking pace, optionally with a dwell time at the reading zone, e.g., controlled by stop/go signaling. Likewise the items can be carried on a conveyor or other powered carrier. According to one aspect, the residence time and optionally the RF power density are variable to complement the number of tags to be read, i.e., to be applied long enough and at sufficient power to process successfully the tags that are present, but no longer, and/or not at a power level that is more than sufficient. For this purpose, the code reader commences reading when detecting a given number or density of tags that arrive in a group or are predicted to arrive, and continues for a time sufficient to achieve a predetermined reading success rate. In certain embodiments, the residence time is variable, including by signaling to a human who is moving the items to start, pause, speed up or slow down as needed. In other embodiments the residence time is variable by controlling the operation or speed of a conveying apparatus or by opening and closing turnstile-like doors.

According to one aspect, the RFID read and write antennas are disposed to as to concentrate interrogation and response RF energy to a limited volume within the walk-through or otherwise transited enclosure. This can include placing plural antennas in niches structured of reflective conductive material, directing electromagnetic energy to and from the reading zone by directional signal emission and directional antenna sensitivity applied to the reading zone. This can include the use of concave reflective structures carrying the antennas, and optionally can comprise more sophisticated arrangements to confine and direct electromagnetic energy to the antennas, such as parabolic concentrators, Fresnel reflector segments, and/or meta-material waveguide structures.

The approaches to and from the enclosure ("vestibules") are configured on one or more of the sides, bottom and top to limit the propagation of RF energy between the antennas and outside stray tags. This is accomplished by one or more of requiring reflections that elongate the signal path propagation length, and/or ensuring that signals in the vestibules are incident on lossy dielectric material thicknesses or frequency specific stopband attenuation traps such as Salisbury surfaces. According to certain embodiments, an RF absorbent sidewall structure is placed along the inner facing surfaces of the vestibules and contains an electromagnetically absorbent lossy material. Advantageous absorbent materials include carbon loaded foam, rubber material with embedded graphite or ferromagnetic particulate inclusions such as ferrite. In one embodiment, inward facings or thicknesses of the vestibule walls have absorbent and/or stopband materials or structures, and outward thicknesses or backsides of the walls are conductive so as to reflect inwardly, e.g., having a reflective film surface.

The Salisbury screen is a known approach to achieving RF-absorption at a distinct narrow frequency stopband. U.S. Pat. No. 2,599,944 ABSORBENT BODY FOR ELECTROMAGNETIC WAVES ("Salisbury," the disclosure of which is also incorporated) describes such a structure. A composite material structure damping electromagnetic propagation is mounted on the conductive wall surfaces of an enclosure, as applied to the present disclosure placed on vestibule walls between the inner reading zone and the outside, to render those surfaces electromagnetically non-reflective at a frequency band determined by the dimensions of the composite material structure. Other approaches may include, carbon loaded RF attenuating foams, composite rubber ferrite materials, or similar structures or materials. The extent of conductive particulate or dielectric loading is preferably sufficient to attenuate RF signals incident on the vestibule walls to preclude interaction with stray tags located beyond a given range, e.g., one to three meters. Attenuation of reflected signal strength at the vestibule walls is used together with clamshell reflective structures at the antennas, generally directing propagation laterally across the reading zone as opposed to longitudinally or obliquely down the pathway between the vestibule walls.

According to certain embodiments of the present disclosure, the frequency band or bands to be damped include at least the RFID UHF read/response frequency of the tags. The surfaces carrying the composite structure may include at least one side wall of a more or less elongated vestibule leading into the reading zone. In alternative embodiments, the composite is included along both opposite side walls as well as the top and bottom of the vestibule and/or the antenna enclosure and vestibule may be comprised of reflective materials placed in such a way as to ensure the majority of reflected energy is re-directed back into the reading zone.

The Salisbury patent discloses a composite of graphite-coated canvas (which is conductive), spaced apart from a metal back surface (i.e., a conductive ground plane) by wood blocks. The spacing determines the frequency that is absorbed. An advantageous spacing is approximately a quarter wavelength ($\lambda/4$). Circuit and transmission line theories can show that the ground plane, which is a short circuit ($\approx 0\Omega$ impedance), is transformed to an open circuit ($\approx \infty\Omega$ impedance) at $\lambda/4$ distance from the ground plane. By placing the resistive sheet at the $\lambda/4$ spacing, a 377$\Omega$ impedance is disposed in parallel with the reflected open circuit. This results in a structure in which an incident plane RF wave, which has a 377$\Omega$ impedance in free space, is matched to the 377$\Omega$ load sheet. Ideally, the composite totally absorbs the incident wave's energy. Little or no energy propagates by reflection from the composite, in either direction between the reading zone and articles that are outside. It is likewise possible to produce the same effect with other specific structures, such as a conductive film layer of carbon or graphite loaded material on the inner side of the vestibule wall (like the Salisbury graphite coated canvas), spaced by a nonconductive plastic spacing layer (functionally similar to the Salisbury wood spacers), from a conductive backplane formed by a reflective film.

Electromagnetic signal strength is attenuated according to the inverse square of the propagation distance. The attenuation achieved adding a Salisbury or other damping material and configurations has an attenuating effect similar elongating the propagation path, especially the length over indirect (reflected) propagation paths. The desired extent of signal attenuation, namely sufficient to prevent RF from exiting the vestibule area at effective signal strength to interact with stray tags, preferably is achieved in part by the geometric configuration of the vestibule watts. Relatively narrow transverse vestibule wall spacing, and a relatively tong vestibule bounded pathway, both tend to lengthen the available longitudinal and oblique (reflected) path lengths and prevent direct line of sight paths between stray tags outside and points from which signals originate or are reflected. Geometric arrangement atone or together with attenuating damping materials, are such that RE propagation from the antennas to stray tags outside is attenuated to the extent that stray tag reading is rendered ineffective, for example within a predetermined range, for example one to ten meters, preferably a range beyond three or four feet (1.0 to 1.3 m). According to the disclosed embodiments, attenuation between the antennas and stray tags is obtained by at least 10 dB, By preventing direct line of sight between the antennas and the non-target stray tag population and causing reflections that lengthen the signal path prior to encountering non-target tags attenuation may also be achieved without the use of lossy absorbers, and vice versa. According to exemplary embodiments, both geometry and lossy absorbers and/or bandstop arrangements can be employed to obtain the desired attenuation of at least 10 dB and potentially 20 dB if optimized as discussed.

The invention achieves an effective high tag reading success rate and an advantageously low rate of interaction with stray tags. These are by employing one or more all of a Salisbury type material, other RF absorptive materials or structures, a geometry elongating propagation path lengths, and limiting interrogation and/or response power densities and residence times. Preferably the applied and received signaling is only just sufficient to achieve a desirably high tag ID read rate if not 100% success in all worst case scenarios.

Among other objects, the invention provides a method and apparatus for reading high density populations of tags transiting an open-ended portal under human power. The method maintains high RF power density while limiting or eliminating the incidence of unintended interaction with tags outside the footprint of the portal. This is accomplished in part by manipulating the RF power direction and shape, both as to direct and reflected RF energy, through the use of radiation pattern manipulation, reflections, and absorption, using for example a Salisbury screen and other lossy materials dimensioned to complement the tag read/response RF energy and incorporated into the overall shape of the outer walls of the reading portal.

These and other objects are accomplished in an RFID portal that reads multiple associated RFID tags on articles in groups moved through an RFID code reader having interrogation/charging and receiving/detection antennas concentrated on a shielded reading zone. The articles are movable through a passage between the reading zone and an outside area and can be read when paused or moving. The passage has a conductive wall at the reading zone that homogeneously distributes RF energy over the articles therein, and a vestibule into and/or out of the reading zone, preferably configured to attenuate reflected electromagnetic energy in the predetermined frequency band. This vestibule may comprise an electromagnetic damping surface structure or reflective geometries to achieve attenuation. Associated methods include limiting a residence time and/or processing time during which the interrogation and response antennas are active (which can include varying group transit speed), and likewise the amplitude and sensitivity of the antennas, to be just sufficient to process a substantial majority of RFID codes in the groups while minimizing unwanted interaction with RFID tagged articles that may be outside.

BRIEF DESCRIPTION

A number of exemplary embodiments of the invention are depicted in the appended drawings as nonlimiting examples. In the drawings, FIG. 1 is a plan view showing a read portal according to the invention, including the locations of the antenna read zone and electromagnetic damping surfaces. The transit path is horizontal.

FIGS. 12 and 13 are schematic plan views showing certain signal propagation paths.

DETAILED DESCRIPTION

With reference to the drawings, the disclosed multi-read RFID portal is configured and operated to contain a sufficiently high level of RF power to efficiently and accurately read numerous UHF RFID tags (e.g., hundreds) that are densely disposed within the confines of an open-ended portal structure. The portal structure is electromagnetically shielded and can be sufficiently sized to allow passage of a person either carrying containers or pushing carts laden with tagged goods.

Figure 1:
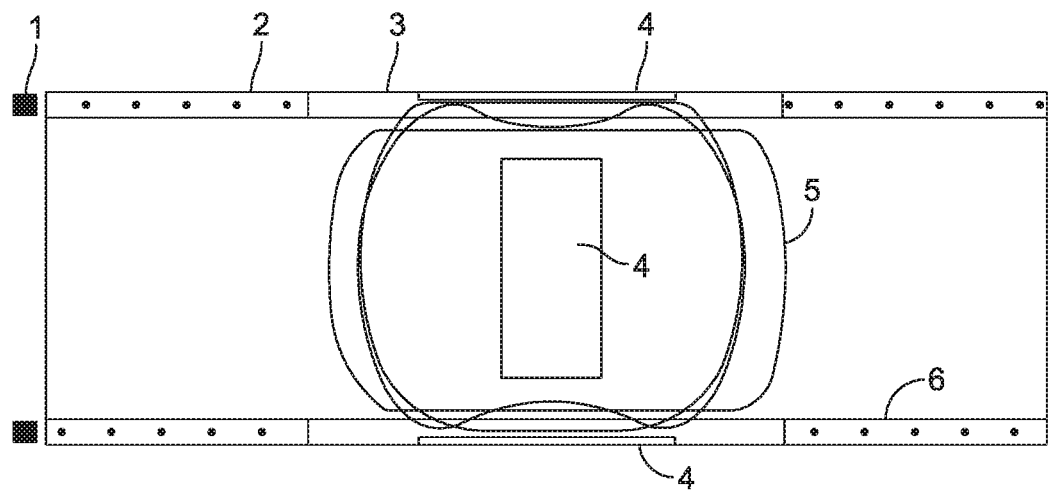
Figure 2:
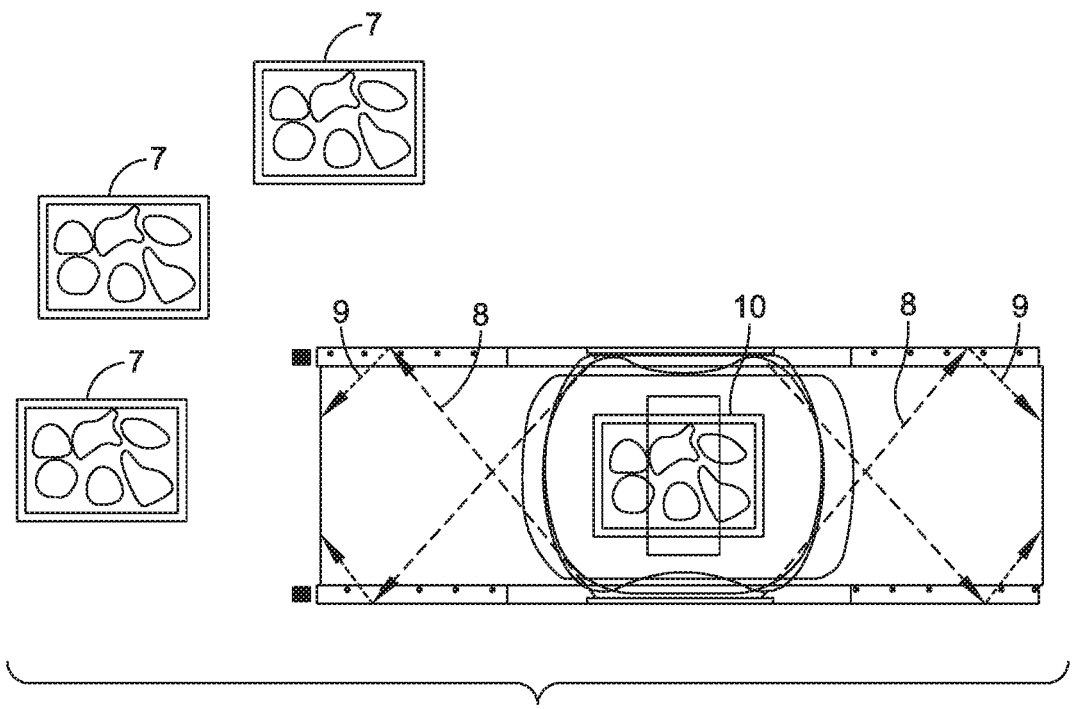
FIG. 2 is a schematic illustration as in FIG. 1, with groups of tagged articles queued for reading and one group having been manually moved into in the reading zone.
Figure 3:
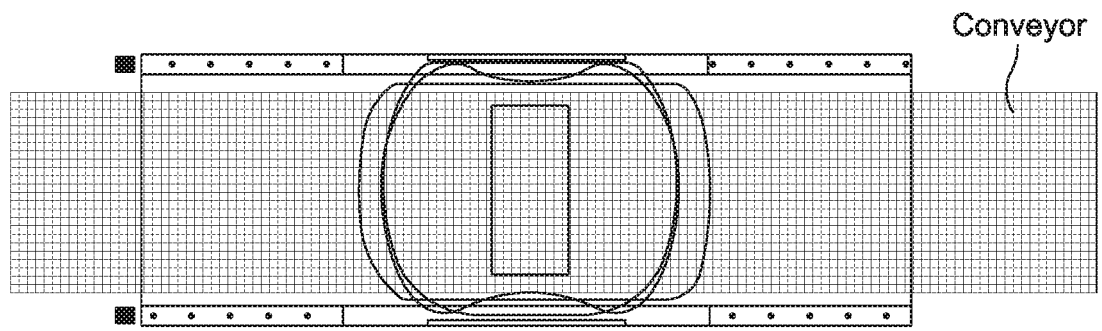
FIG. 3 is a plan view as in FIG. 1, but with a conveyor as the element that moves the groups through the read portal.

The conductive enclosure or portal shown in FIGS. 1, 2, 4 and 5 is dimensioned to accommodate the required RFID tagged items in a container in addition to a person (not shown) moving them through the portal. In alternative embodiments, such as shown in FIG. 3, the portal can be smaller, accommodating bins or bags or the like placed on a conveyor. In these embodiments, the portal is generally shaped as a tunnel defined by an inverted channel, optionally including a base element. In further embodiments, the container for the items can be sized to resemble a shopping cart in which the tagged items are placed, and the cart is passed through a portal defined by a less encompassing enclosure such as a channel with upright side walls and an open top (not shown).

In the embodiments shown in the drawings, the RFID tagged items are preferably densely arranged in a rolling cart or carried in a bag, and are movable at a faster or slower transit speed and/or caused to remain in the reading zone for a longer or slower residence time. The reading zone is the central part of the portal where the RF power density incident on the tags and the receiving antenna sensitivity are sufficient to discern the tags in a known multi-read tag polling/response process.

In exemplary embodiments, the radiated power from the RFID antennas ensures sufficient power density to efficiently charge the multi-read RFID tags, which are otherwise passive devices. Conductive walls adjacent to the reading zone concentrate direct and reflected RF energy for charging and responsive signal propagation. That is, the antenna design and placement choices preferably serve to focus the signal power into the reading zone, i.e., a window or volume through which the tagged items are constrained to pass.

Direct and reflected RF energy are confined by antenna directionality, reflective surface geometry and/or electromagnetic shielding, as completely as reasonably feasible within the footprint of the portal to limit the unintended reading of tags that might be proximal to the portal but outside of the group of tags under scrutiny. Among other aspects, confining the RF energy, placement of the RF read/response antennas into shielding niches that are indented into the portal walls, elongated shielding vestibules that may be at least partly defined by conductive materials, and RF damping or anti-reflective surfacing such as Salisbury quarter wave RF damping arrangements are preferably included.

Tag ID reads can be made quickly in a known polling manner, whereby hundreds of tags are dependably read in the transit time through the reading zone, for example, in the time it takes a human person to transit the portal at a normal walking pace, carrying the tagged items through the reading zone in a bag, sling, container or cart or carried on or about the person while passing through the portal. In alternate embodiments, the tags can be moved through on a conveyor.

According to one aspect, interaction with stray (external) RFID tags can be minimized by using the combination of a just-sufficient residence time in the reading zone, and RF power density that is just sufficient to achieve the read success rate that is needed. That is, the RFID interrogation and tag response reader operation can be limited by one or both of their time of operation and power level so as to be actively transmitting and detecting responses at high power when tags that remain to be read are still within and transiting the portal, and completing the operation by removal of the tags and reducing or stopping RF power as soon as the tags are read. Reducing the power level and/or discontinuing read/detect operations when tags are not present or have substantially all been read, tend to limit unintended tag reads.

The determination of when tags are present may be a function of transit speed and residence time. This is controllable by signaling a human moving the group or by controlling operation of a conveyor carrying the group.

The determination of when substantially all the tags have been read can be empirical, e.g., assuming that the reading process has finished if no more tags are found and read after the "last" one has been read. But that is not preferred because applying the RF charging radiation and seeking to receive responses for any longer than necessary will increase the risk of interacting with a tagged item that is outside the portal and not a member of the group being processed. Therefore according to another aspect, the residence time (which may be determined by transit speed) and the RF radiation density (which may be variable by control signals applied to the antennas) are limited, preferably to be only just sufficient to what is needed. The levels needed are based on information that is sensed or estimated from known parameters. For example, if the number of tags is known to be within a given range or if the success tag reading rate at the outset is used to estimate the likely time needed to read the entire group, it becomes unnecessary to continue to attempt to read tags for longer than that. If a given range of RF radiation density is estimated to produce a given read rate and will process all the expected tags from the group over the expected residence time, it is advantageous to control the RF radiation density to be no higher than needed.

In the depicted embodiments, the side walls, and optionally top and bottom of the portal structure, and at least part of the entry and exit passages incorporate a Salisbury Screen type absorptive area. Other RF absorbing materials that are active in the proper frequency range can be provided in lieu of the Salisbury Screen or in addition thereto, to absorb direct and reflected RF waves from exiting the portal footprint. A suitable lossy carbon-loaded flexible foam sheet stock is the Cuming Microwave product "C-RAM MT," which is considered to provide a broad frequency range of dielectric loss. (See http://stores.cumingmicrowave-onlinestore.com/11-c-ram-mt-30-5-x-24-x-24/.)

As described above, the Salisbury configuration can include a facing conductive layer on the inside surface of the vestibule wall, spaced by a frequency dependent distance from a conductive backplane. Suitable conductive film for the inside surface and the backplane is Safe Living Technologies Inc. product SLT-1053. (See http://www.slt.co/products/RFShieldingWindowFilm/RFWindowFilm-SignalProtect-Clear.aspx). This product is also optically clear, which is desirable to contribute to the open feeling of the disclosed embodiment.

The central section of the portal contains surrounding antennas to read the tagged items from multiple directions using both direct and reflected waves. This section maintains the high RF power density required to power on the passive UHF RFID tags. Examples of antenna placement, including niche mounting and operation in complementary sets, are disclosed for example, in U.S. Pat. No. 9,760,826, which has been incorporated by reference. The arrangement shown has a clamshell structure of conductive material (trapezoidal in cross section) in which five antenna segments are mounted (ten including both sides of the reading zone) to as to be directed inwardly toward the reading zone. Although not shown specifically, the clamshell shape can be parabolic for focusing signal strength. The clamshell structure can also include additional structures for directing electromagnetic energy to and from the antennas, such as Fresnel parabolic segments, meta-material waveguides or the like.

Referring to FIG. 1, in this embodiment a sensor 1 such as a photocell pair can be provided at the inlet end of the portal and coupled to a controller (not shown) to initiate operation when detecting the presence of tagged items to be read. Preferably, such photo-eye sensors at the inlet and outlet of the portal initiate and end read operations. In this way, interaction with stray tags is prevented by not operating the reading apparatus all the time, and instead activating only for a timed or otherwise limited interval when the group of tags to be read is in fact present.

The walls 2 of the vestibule area leading into the central read zone detection are electromagnetically absorptive. For example, the inside of the vestibule walls 2 are lined with a Salisbury bandstop attenuating structure and/or the walls comprise a broadband absorptive layer such as a carbon loaded foam or graphite-loaded rubber or plastic sheet material for resistive loss, or alternatively a ferrite loaded polymer. A conductive film sheet is can be applied on the outsides of the walls 2, as a ground plane or outer barrier against propagation, as explained further below. Walls 2 include at least inwardly reflective walls 3 at the central read zone. The reflective walls 3 confine and magnify RF energy coverage the inside read zone, as generated as well as received by antennas 4 that are provided around the reading zone (e.g., in niches in the sidewalls and optionally the top and/or bottom).

The primary coverage area for the antennas is area 5, in and around the central part of the portal.

Proceeding to through the portal, absorptive areas 6 are also provided at the exit end. Tagged items that are outside the portal such as carts 7 in FIG. 2, are not only shielded by the portal walls, but insofar as the carts are along a propagation path from the inside of the portal, most of the incident RF energy shown along dotted lines 8 is reflected between the portal walls, encountering the Salisbury damping material and emerging as attenuated energy 9, such that the antennas have limited if any interaction with the items in the external carts 7, at least very substantially less than the interaction of the antennas with the cart 10 that is being read actively.

Figures 4, 5:
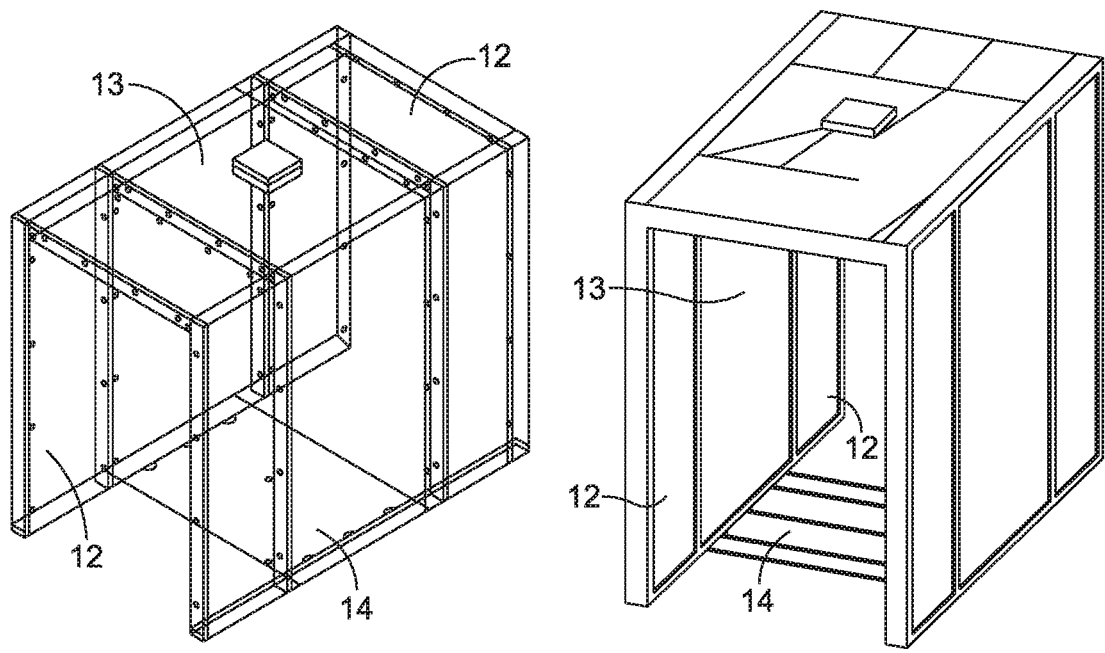
FIGS. 4 and 5 are perspective illustrations of the portal, FIG. 4 being partly in phantom to show internal structures.
Figure 6:
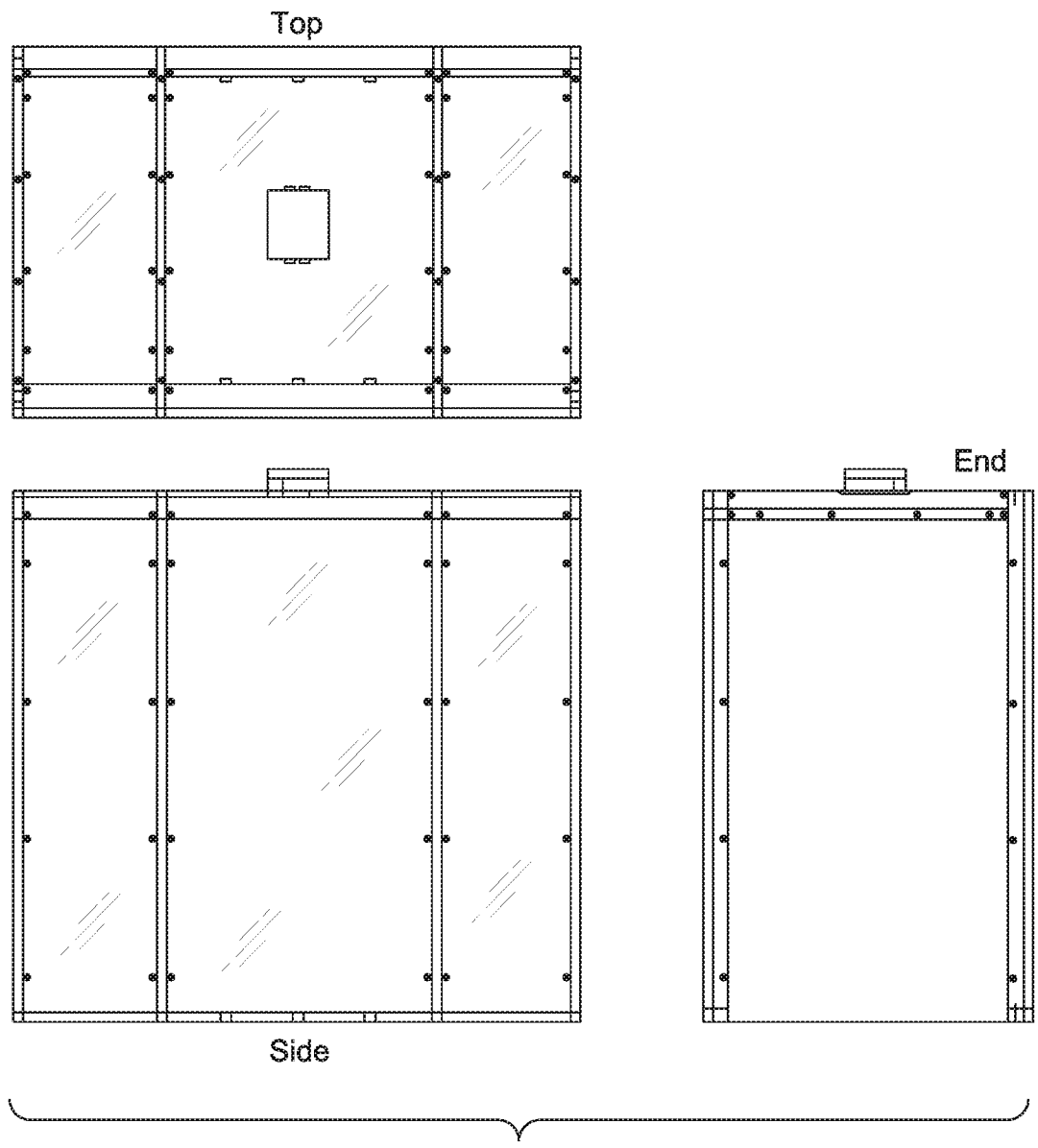
FIG. 6 is a set of plan and elevation views showing specific dimensions of an embodiment sized for manually pushing carts through the reading zone.
Figure 7:
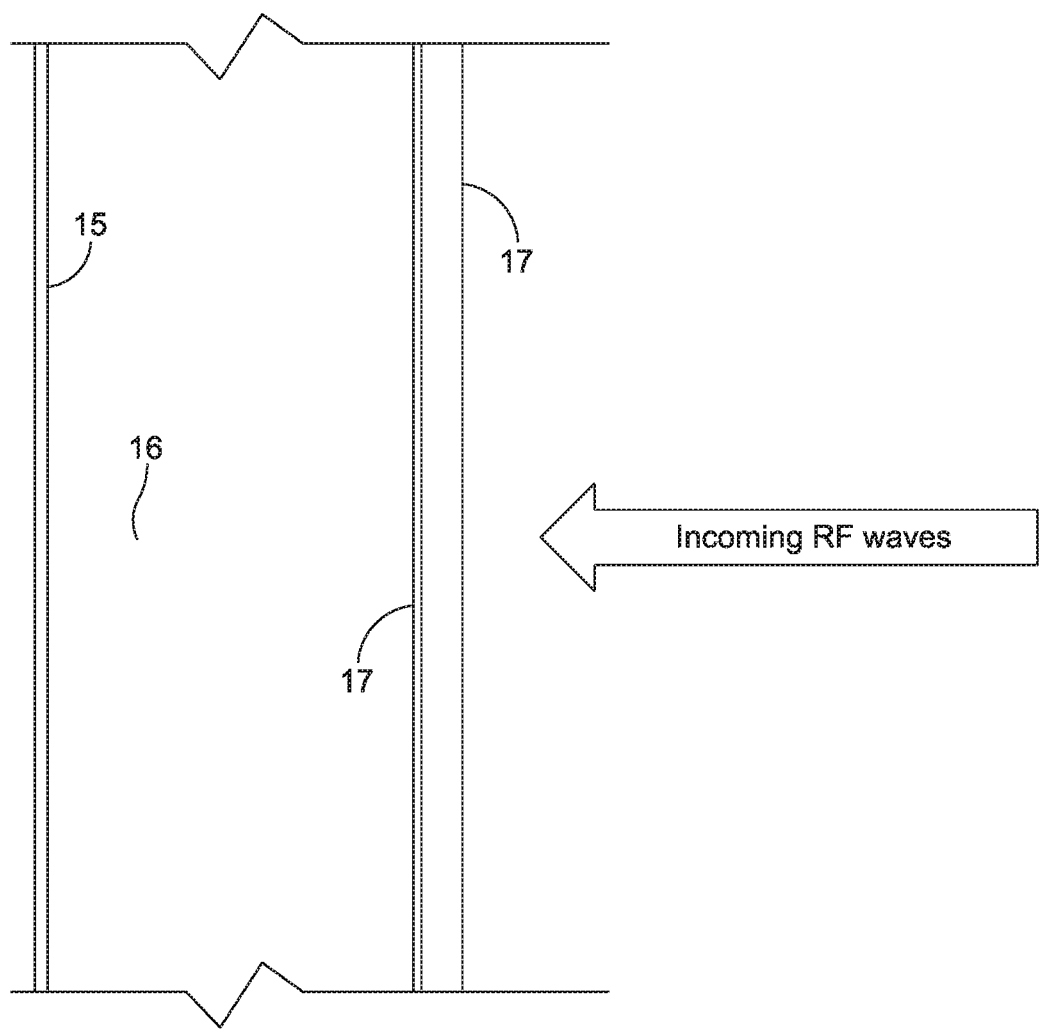
FIG. 7 is a schematic illustration showing a direction if propagation of RF waves.

In FIG. 7, the electromagnetically reflective surface needed as the ground plane of the Salisbury screen is provided by the metal skin of the portal structure. In FIGS. 4 and 5, area 12 can be absorptive. Area 13 is reflective (see also the reflective floor 14, which may include one or more bottom-mounted antennas). Area 15 is a metallic reflective wall forming the back side of the Salisbury screen and the outside skin of the portal.

An air space 16 is preferably dimensioned to correspond to the $\lambda/4$ spacing for the Salisbury screen where $\lambda$ is the wavelength of the center frequency used. As a nonlimiting example configured for RFID multi-reading in the US, a 3.226 inch space 16 corresponds to a quarter wave length with a center frequency of 915 MHz, the nominal US operational frequency. A lossy dielectric 17 with approximately 377Ω surface resistance matches the free air impedance. A low loss dielectric plastic 18 structurally supports and prevents damage to the thin lossy layer 17. The direction of the RF waves is shown in FIG. 7.

The foregoing dimensions can be varied according to the particular RFID operational frequency or frequencies used to charge the tags and to receive responses from the tags. Presently, worldwide UHF operational frequencies are typically from about 860 to 960 MHz. Likewise, it is within the scope of the invention to enable two or more different operational frequencies to be accommodated, preferably with sections of the passageway between the reading zone and the area outside the reading zone arranged to include portions configured to attenuate the two or more different frequencies.

In addition to the foregoing aspects and embodiments, the portal apparatus advantageously is structured and configured to discern the ID codes of multi-read tags on items in bags or containers. One example is RFID tags on garments or other textile articles in a cart pushed by a human simply while walking thru the portal. In a laundry arrangement or the like, the tags in a cart could number up to thousands, but often are 500 or fewer.

The same structures and methods advantageously reduce signal "bleeding" and interaction with external tags in other specific applications, including but not limited to applications with motor driven conveyors through read portal tunnels. In that case, a variable speed conveyor control can be lined to the controller of the tag reading elements to selectively control the residence time in the reading zone. In some embodiments, RF power levels are selectable in a range or in a set of plural optional power levels. The power level is advantageously varied to complement the size of tag (smaller tags being more difficult to discern than larger ones), the quantity and density of tags, based either on a predicted time needed or based on a detected attribute such as the success rate experienced when reading a subset of the tags at the very beginning of a read operation.

In some embodiments with walk-through human ambulation (such as carrying a bag of tagged articles or pushing a wheeled cart or the like), can vary residence time by signaling the human to stop/start/speed up or slow down, again based on predicted time needed or empirically by the time taken to read a subset.

The disclosed configurations are especially effective with RFID tagged textile items such as cyclically processed laundry. Laundry tags are small and have very small antenna and laundry items are densely disposed in bags, slings or carts. For manually moved groups, visible or audio signaling (especially LED lights) can signal the person walking thru to set or change pace. Thus if the number or density of tags changes from time to time, the signaling can dictate to slow down (yellow), go or speed up (green), or pause/stop (red) in addition to other signaling, for example to indicate that the read operation has been completed. A display screen (not shown) can be provided to show the status of reading operations as they progress.

Figure 8:
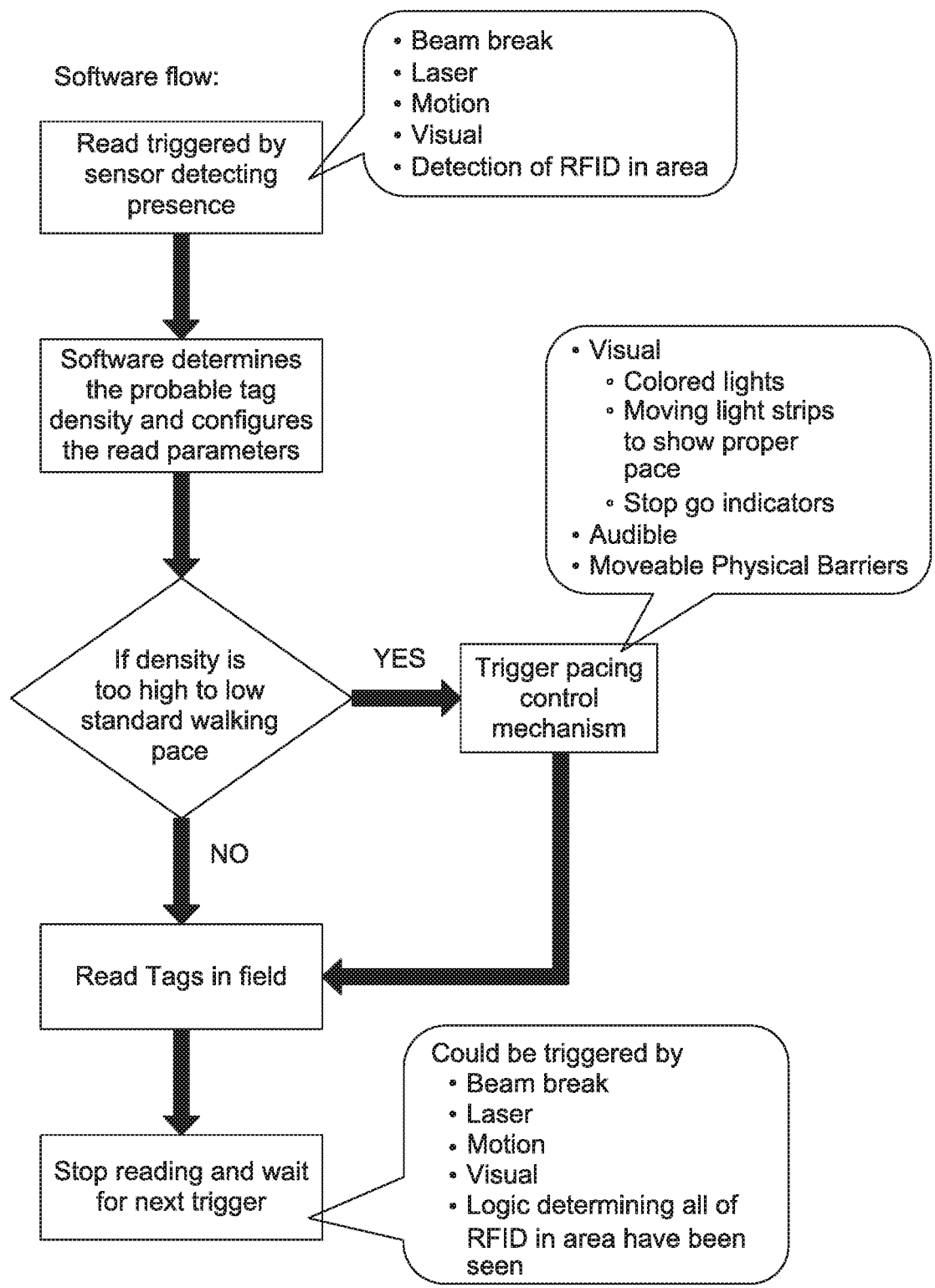
FIG. 8 is a flowchart illustrating attributes and method steps associated with at least semi-automatic control of the portal using a programmed computer (not shown) and process.

FIG. 8 is a flowchart that shows the steps in the operation of the read portal according to one embodiment. The steps can be programmed into the same computer system that is coupled to the portal antennas and effects the operations discussed above.

Figure 9:
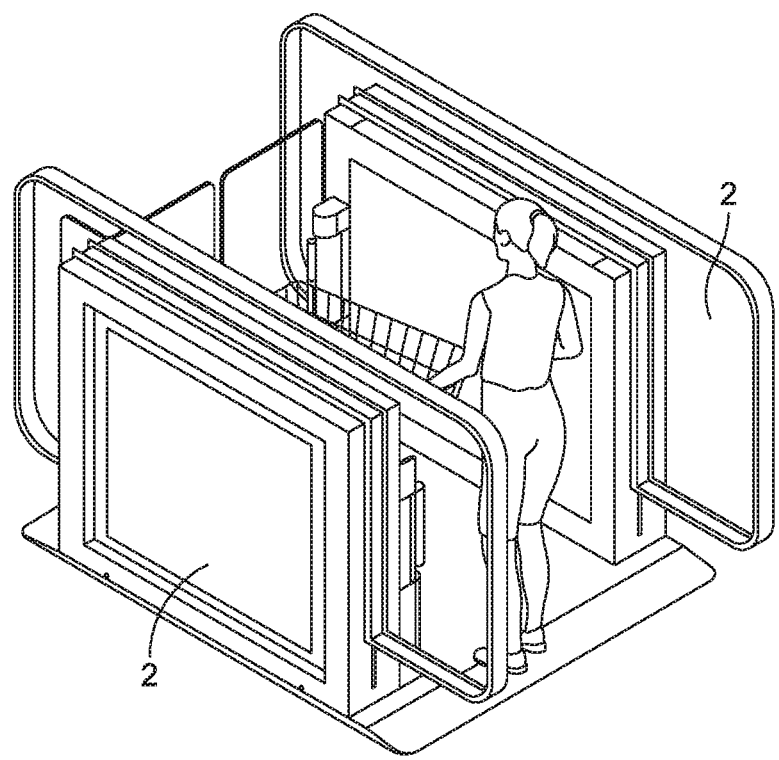
FIG. 9 is a perspective drawing showing the application of the invention to multi-read scanning of articles in a shopping cart pushed by a person into a delineated reading zone, as might be typical of an automated or semi-automated retail checkout line.
Figure 10:
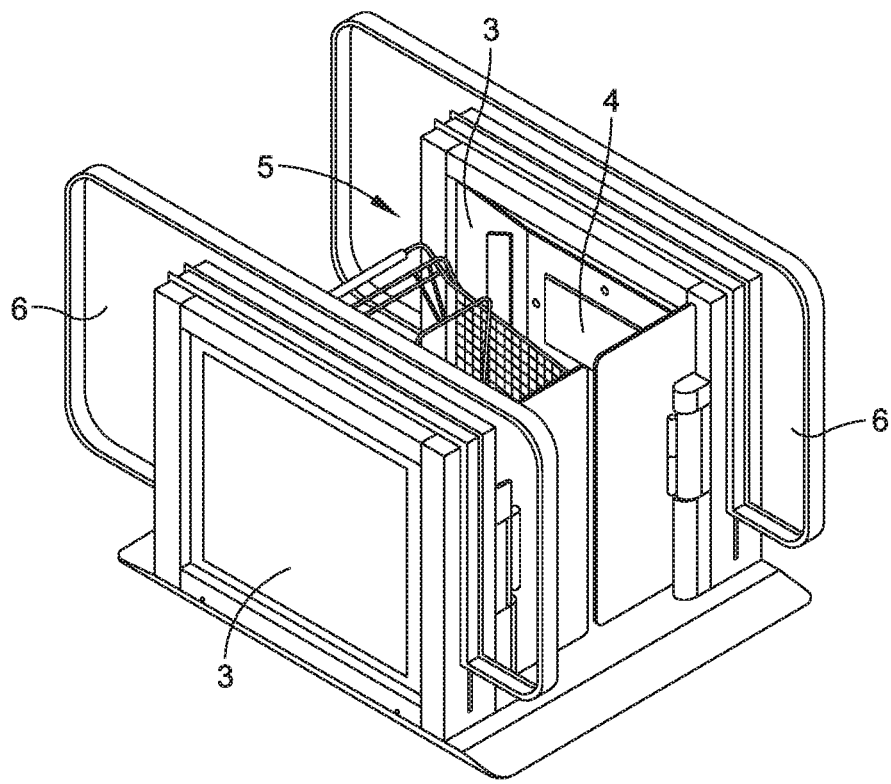
FIG. 10 is a perspective drawing substantially from an opposite side of the reading zone and including illustration of an end door.
Figure 11:
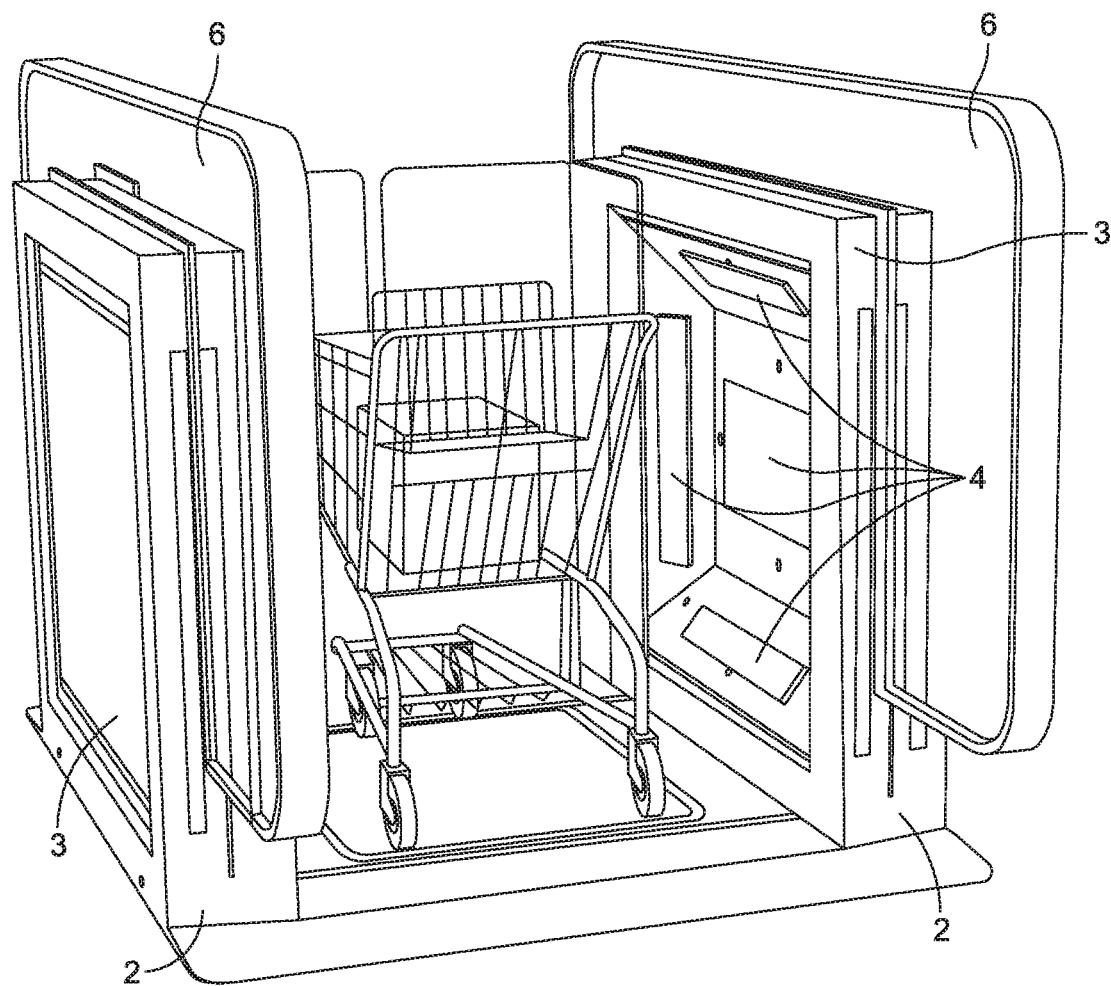
FIG. 11 is a perspective illustration corresponding generally to FIGS. 9 and 10 and showing additional details.

FIGS. 9-11 show an exemplary application of the invention to multi-read scanning of articles in a shopping cart pushed by a person into a delineated reading zone, as might be typical of an automated or semi-automated retail checkout line. Among other aspects, the configuration concentrates the electromagnetic signals that are sent and received to the zone 5, where RFID tagged items are situated, and minimizes potential communication with RFID tagged items that are outside of the zone 5, especially miscellaneous items of stock (not shown) that are shelved nearby in a retail store or being carried or carted about by other customers.

The embodiment in FIGS. 9-11 can contain a Salisbury RF attenuation structure on the inner facing sides of vestibule walls 2 or the walls 2 themselves can be structured as Salisbury stopgap attenuators. In that embodiment, the inner sides are faced with a conductive sheet spaced from a conductive backplane by an air gap or other dielectric space configured to attenuate the operational RFID charging and reading frequencies used. Alternatively the bodies of vestibule walls 2 can comprise a loading of particulate carbon, graphite, ferrite or the like, rendering the walls 2 lossy. Preferably, a conductive sheet is applied to the outsides of lossy vestibule walls, for redirecting electromagnetic energy back inwardly by reflection.

A passage for the cart and the associated person is defined as an elongated vestibule between walls 2 leading into and beyond the central reading zone 5. The walls 2 have clamshell shaped conductive wall portions 3 that exploit electromagnetic reflection in and immediately adjacent to the reading zone, so as to concentrate electromagnetic interaction there as discussed above. Likewise, one or preferably several absorptive structures are provided along areas 6, disposed outwardly from the reading zone 5, so as to damp propagating reflections at one or more operative RFID scanning frequencies. The absorptive structures can extend along two opposite sidewalls 2 of the vestibule up to a height somewhat above the highest point at which scannable items can be situated in the cart. According to different possible embodiments, the reflective portions for concentrating signal amplitude in the reading zone and the damping portions for reducing the amplitude of signals propagating by reflection, can be placed on one or two opposite sides of the passage, optionally above and below the passage, and optionally across the entry and exit paths via movable doors or through circuitous pathway layouts that preclude line-of-sight signal pathways.

The reflective portions of walls 2 are placed strategically to concentrate signal strength at the reading zone 5, subject to the antennas 4. The damping portions are placed so as to reduce signal propagation (both transmit and receive) outside of the reading zone 5. These placements are selected in part to confine propagation of signal strength at the reading zone and in part to damp lines of signal propagation that lead to RFID tagged stock outside of the reading zone. An enclosure having one to six sides electromagnetically damping surfaces enclosing the pathway between vestibule walls 2 provide these effects, and are useful if arranged to complement external attributes of the premises such as structures and distances between the passage and the outside RFID tagged stock. In the illustrated embodiment, the walls 2 are primarily along opposite lateral sides and to a height somewhat above the articles to be scanned in the reading zone.

The respective side wall or walls (and optionally also top, bottom and ends) can be arranged to serve additional functions. For example, the bottom of the passage can be configured as the pan of a weigh scale, whereby the measured weight of the cart may be compared to the expected weight as a result of RFID code scanning results, after summing the expected weights based on stored weight data cross referenced to RFID codes. The walls can carry optical data input devices such as still or video cameras, or laser UPC barcode scanners to supplement data input by comparison of barcode values to detected RFID tag codes. As another example, the side wall(s) can be used to present promotional messages, to announce offers or the application of discounts, to offer free items to a customer, etc.

FIG. 10 is a perspective drawing substantially from an opposite side of the reading zone and including illustration of an optional end door. The end door likewise can serve signal reflective confinement or reflection damping functions as well. In certain embodiments, the end door is controllable so as to be closed during a reading operation and opened when the reading operation has been successfully completed, thereby signaling the person to continue on through the pathway to an exit.

FIG. 11 is a perspective illustration corresponding generally to FIGS. 9 and 10 and showing additional details. FIGS. 12 and 13 are comparative plan views, FIG. 13 including the clamshell reflective structure around an antenna (only one being shown). The clamshell reflective structure not only focuses signal strength on the reading zone but also elongates the propagation path of signals that are reflected transversely and finally obliquely across the reading zone. In this case the antenna has an exemplary power distribution of 3 dB down at 20° off the center line, whereby direct line propagation at a signal strength above half power (−3 dB) substantially impinge on the inner walls of the vestibule and can be damped by Salisbury or other lossy means as discussed above.

The invention has been disclosed in connection with certain embodiments and examples that are intended to be illustrative rather than limiting. The invention is not limited to the structures and features used as examples. Reference should be made to the appended claims rather than the foregoing examples, to assess the scope of exclusive rights that are claimed.

What is claimed is:

1. An apparatus for multi-reading RFID codes carried by articles in a group, comprising:

an enclosure having first and second sidewalls that together define at least one passage through the portal, the at least one passage having an inlet and an outlet;

an RF code reader including interrogation and response detection antennas incorporated into at least one of the first and second sidewalls of the enclosure, the interrogation and response detection antennas directed inwardly into the enclosure configured to concentrate RF signals in a reading zone, with controls for applying an RF charging signal in at least one predetermined frequency band and discerning RFID codes from responsive signals received from tagged articles in the group; and at least one first sensor positioned adjacent to the inlet of the at least one passage for initiating a reading operation by the RF code reader;

wherein at least one of the first and second sidewalls includes a conductive wall with at least one surface facing into the passage, wherein the conductive wall is structured for attenuating electromagnetic energy at least in the predetermined frequency band so as to limit effective interaction with any stray RFID tagged articles outside the enclosure by at least one of a lossy material in the conductive wall damping electromagnetic propagation, a bandstop structure on the conductive wall facing into the passage for damping propagation in the frequency band, and by reflection of the RF signals along a path that is elongated by reflections against the conductive wall.

2. The apparatus of claim 1, wherein the conductive wall defines a length of at least one of the first and second sidewall, a top wall, and a bottom wall of the vestibule.

3. The apparatus of claim 1, wherein the conductive wall includes a focusing portion at the reading zone defining at least one of a clamshell shape, a parabolic shape, a Fresnel configuration and a meta-material.

4. The apparatus of claim 1, wherein the damping structure comprises at least one of a Salisbury composite surface, a broadband RF attenuating material, an attenuating structure, and a geometry that elongates one or more propagation paths between the reading zone and an outside of the passage, configured to attenuate electromagnetic reflection at an RFID frequency band.

5. The apparatus of claim 4, wherein the damping structure attenuates electromagnetic propagation between the RF code reader and the stray RFID tagged articles by at least 10 dB.

6. The apparatus of claim 1, wherein the damping structure is configured to damp electromagnetic reflection at a frequency within a UHF RFID frequency band of substantially 860 to 960 MHz.

7. The apparatus of claim 1, wherein the conductive wall is electromagnetically reflective at the reading zone and configured to transmit direct RF energy and reflected indirect RF energy between the antennas and the RFID codes carried by articles in the group of articles when in the reading zone.

8. The apparatus of claim 1, wherein the passage and the enclosure are configured to accommodate a shopping cart.

9. The apparatus of claim 1, further comprising at least one second sensor positioned at the outlet of the passage for terminating a reading operation by the RF code reader.

10. The apparatus of claim 1, wherein at least one of the first and second sidewalls includes:
a first material layer; and
a second material layer disposed at a distance from the first material layer, the first material layer being formed from a different than the material from which the second material layer is formed, and
wherein the distance is based on a wavelength of an RF signal having a frequency within the at least one predetermined frequency band.

11. The apparatus of claim 1, wherein the enclosure defines an open top between the first and second sidewalls.

12. A method for multi-reading RFID codes carried by articles, comprising the steps of:
associating the articles in groups of plural articles in proximity to one another for multi-reading the RFID codes;
receiving the groups successively into an enclosure, the enclosure having first and second side walls that together define at least one passage through the enclosure, the at least one passage having an inlet and outlet, an RF code reader including interrogation and response detection antennas being incorporated into at least one of the first and second side walls of the portal, the interrogation and response detection antennas directed inwardly into the enclosure configured to concentrate RF signals in a reading zone accommodating the groups;
in response to receiving a signal from at least one first sensor positioned at the inlet of the at least one passage, processing the groups by applying an RF charging signal in at least one predetermined frequency band and discerning RFID codes from responsive signals received from tagged articles in the group;
limiting at least one of a residence time during which the groups remain in the reading zone and a processing time during which the interrogation and response antennas are active or varying the residence time during which the groups remain in the reading zone for interrogation of the RFID codes, to a time only sufficient to process a majority of RFID codes in the groups; and
limiting at least one of an amplitude of the charging signal, sensitivity of reception of the responsive signals, and time of application of the charging and responsive signals to be only sufficient to process a majority of RFID codes in the groups.

13. The method of claim 12, associating articles in groups comprises at least one of carrying the groups of plural articles in respective containers and supporting the groups on at least one powered movable conveyance.

14. The method of claim 12, comprising varying the residence time during which the groups remain in the reading zone by at least one of signaling a human operator for one of speeding up, slowing, pausing, stopping movement of the containers and controlling an operational speed of the movable conveyance.

15. The method of claim 12, wherein the containers comprise at least one of bins, bags, slings and rolling carts.

16. A method for multi-reading RFID codes carried by articles, comprising the steps of:
associating the articles in groups of plural articles in proximity to one another for multi-reading the RFID codes;
receiving the groups successively into an enclosure, the enclosure having first and second side walls that together define at least one passage through the enclosure, the at least one passage having an inlet and outlet, an RF code reader including interrogation and response detection antennas being incorporated into at least one of the first and second side walls of the portal, the interrogation and response detection antennas directed inwardly into the enclosure configured to concentrate RF signals in a reading zone accommodating the groups;
in response to receiving a signal from at least one first sensor positioned at the inlet of the at least one passage, processing the groups by applying an RF charging signal in at least one predetermined frequency band and discerning RFID codes from responsive signals received from tagged articles in the group;
limiting at least one of a residence time during which the groups remain in the reading zone and a processing time during which the interrogation and response antennas are active, to a time only sufficient to process a majority of RFID codes in the groups; and
moving the groups to and from the reading zone through the at least one passage of the enclosure from an area outside of the enclosure;
wherein at least one of the first and second side walls includes a conductive wall with at least one surface facing into the passage and carrying an electromagnetic damping structure configured to attenuate electromagnetic energy at least in the predetermined frequency band.

17. The method of claim 16, further comprising attenuating the electromagnetic energy in a stopband encompassing the predetermined frequency band using a Salisbury damping configuration having a conductive surface spaced from a conductive backplane by a distance determined from a wavelength of the predetermined frequency band.

18. The method of claim 16, further comprising variably limiting at least one of said residence time, said processing time, said amplitude of the charting signal, said sensitivity of reception of the responsive signals, and a time of application of the charging and responsive signals, according to at least one of a predicted time to process said majority for successive ones of the groups, and an empirical rate of processing based on a rate of reading a preliminary sampling of the RFID codes in the successive groups.

* * * * *